US008223458B2

(12) United States Patent
Mochizuki et al.

(10) Patent No.: US 8,223,458 B2
(45) Date of Patent: Jul. 17, 2012

(54) MAGNETIC HEAD HAVING AN ASYMMETRICAL SHAPE AND SYSTEMS THEREOF

(75) Inventors: Masafumi Mochizuki, Kanagawa (JP); Yohji Maruyama, Saitama (JP); Etoh Kimitoshi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 219 days.

(21) Appl. No.: 12/756,947

(22) Filed: Apr. 8, 2010

(65) Prior Publication Data

US 2011/0249359 A1 Oct. 13, 2011

(51) Int. Cl.
*G11B 5/31* (2006.01)

(52) U.S. Cl. .................................................. 360/125.1

(58) Field of Classification Search ................ 360/125.1
See application file for complete search history.

(56) References Cited

U.S. PATENT DOCUMENTS

| 5,473,491 | A | 12/1995 | Fujisawa et al. ............. 360/126 |
|---|---|---|---|
| 6,185,063 | B1 | 2/2001 | Cameron .................... 360/78.04 |
| 6,950,277 | B1 * | 9/2005 | Nguy et al. ............... 360/125.14 |
| 6,967,810 | B2 | 11/2005 | Kasiraj et al. .............. 360/78.04 |
| 7,443,625 | B2 | 10/2008 | Hamaguchi et al. ............ 360/55 |
| 2003/0189774 | A1 | 10/2003 | Hamaguchi et al. ............ 360/13 |
| 2005/0069298 | A1 | 3/2005 | Kasiraj et al. ................. 386/125 |
| 2005/0071537 | A1 | 3/2005 | New et al. ..................... 711/100 |
| 2006/0232888 | A1 | 10/2006 | Satoh et al. ................ 360/244.8 |
| 2006/0262453 | A1 | 11/2006 | Mochizuki et al. ........... 360/125 |
| 2007/0013918 | A1 | 1/2007 | Hauger et al. ................. 356/512 |
| 2007/0206323 | A1 | 9/2007 | Im et al. ........................ 360/126 |
| 2009/0002896 | A1 * | 1/2009 | Mallary et al. ................ 360/319 |

FOREIGN PATENT DOCUMENTS

| EP | 1 521 261 | 4/2005 |
|---|---|---|
| JP | 2006/221786 | 8/2006 |
| JP | 2006/323899 | 11/2006 |
| JP | 2006/325321 | 11/2006 |
| JP | 2007/164935 | 6/2007 |
| JP | 2009/016024 | 1/2009 |
| WO | 99/45534 | 9/1999 |

OTHER PUBLICATIONS

Tagawa et al., "Shingled Perpendicular Magnetic Recording Technology" The Institute of Electronics, Information and Communication Engineers, ®2009 IEICE, IEICE Technical Report.

(Continued)

*Primary Examiner* — Mark Blouin
(74) *Attorney, Agent, or Firm* — Zilka-Kotab, PC

(57) ABSTRACT

A magnetic head, according to one embodiment, includes a main magnetic pole having a protruding portion such that a distance from a first side of a trailing edge of the main magnetic pole to a leading edge of the main magnetic pole is different from a distance from a second side of the trailing edge of the main magnetic pole to the leading edge of the main magnetic pole, an auxiliary magnetic pole, and a coil wound around a magnetic circuit, the magnetic circuit including the main magnetic pole and the auxiliary magnetic pole. In another embodiment, a disk drive system includes a magnetic storage medium, at least one magnetic head as described previously for writing to the magnetic medium, a slider for supporting the magnetic head, and a control unit coupled to the magnetic head for controlling operation of the magnetic head. Additional systems and heads are also presented.

16 Claims, 10 Drawing Sheets

(a)

(b)

OTHER PUBLICATIONS

U.S. Appl. No. 12/556,472, filed Sep. 9, 2009.
Wood, Roger et al., "The Feasibility of Magnetic Recording at 10 Terabits Per Square Inch on Conventional Media" ©2009 IEEE, IEEE Transactions on Magnetics, vol. 45, No. 2, Feb. 2009, p. 917-923.
Jaquette, G.A., "LTO: A better format for mid-range tape" ©2003 IBM, IBM Journal Res. & Dev., vol. 47, No. 4, Jul. 2003, pp. 429-444.
Restriction Requirement from U.S. Appl. No. 12/556,472 dated Jan. 17, 2012.

* cited by examiner (Figure 1)
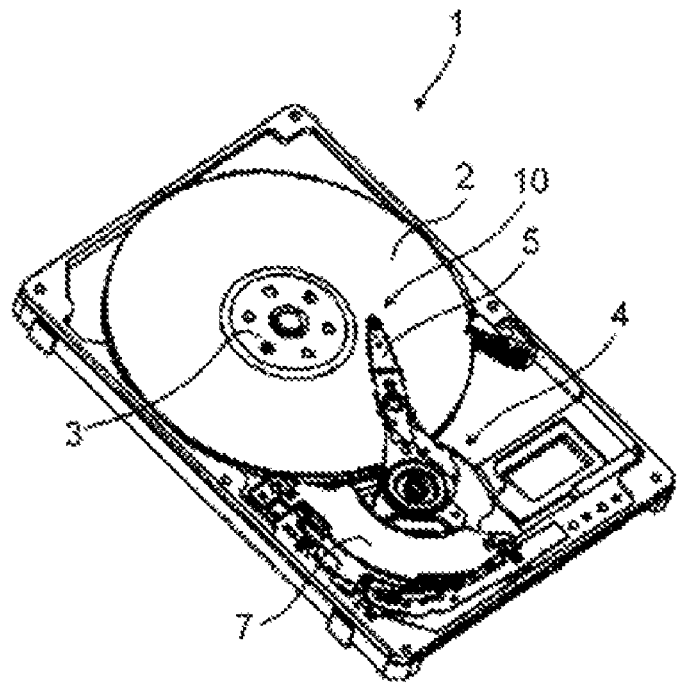
(Figure 2)
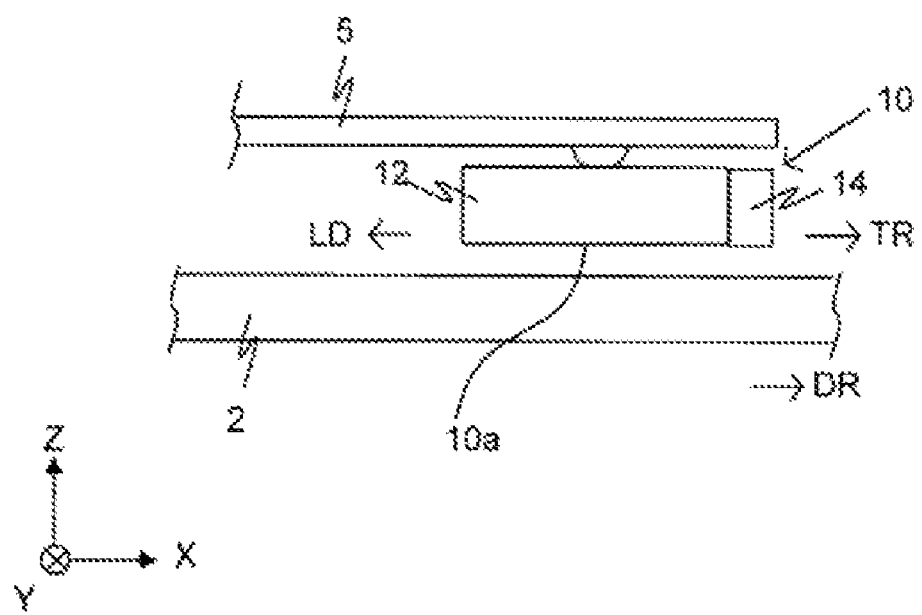

(Figure 3)
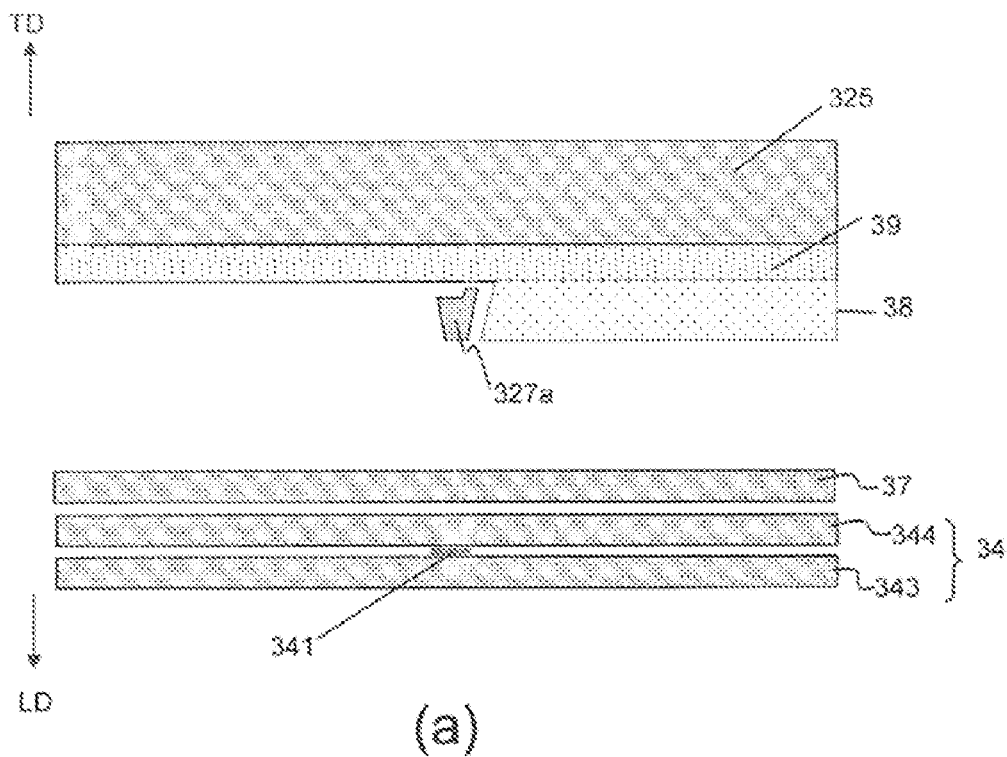
(a)
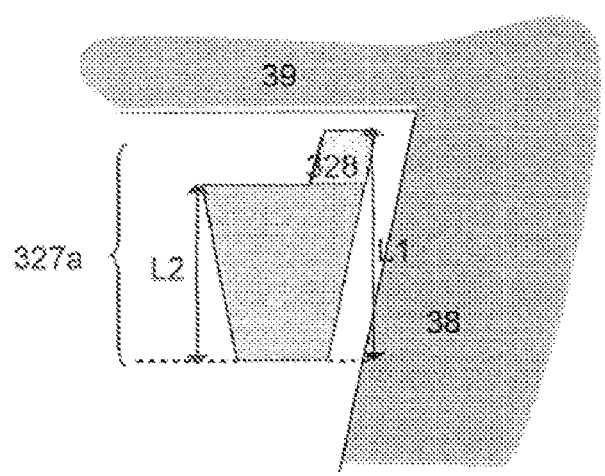
(b)

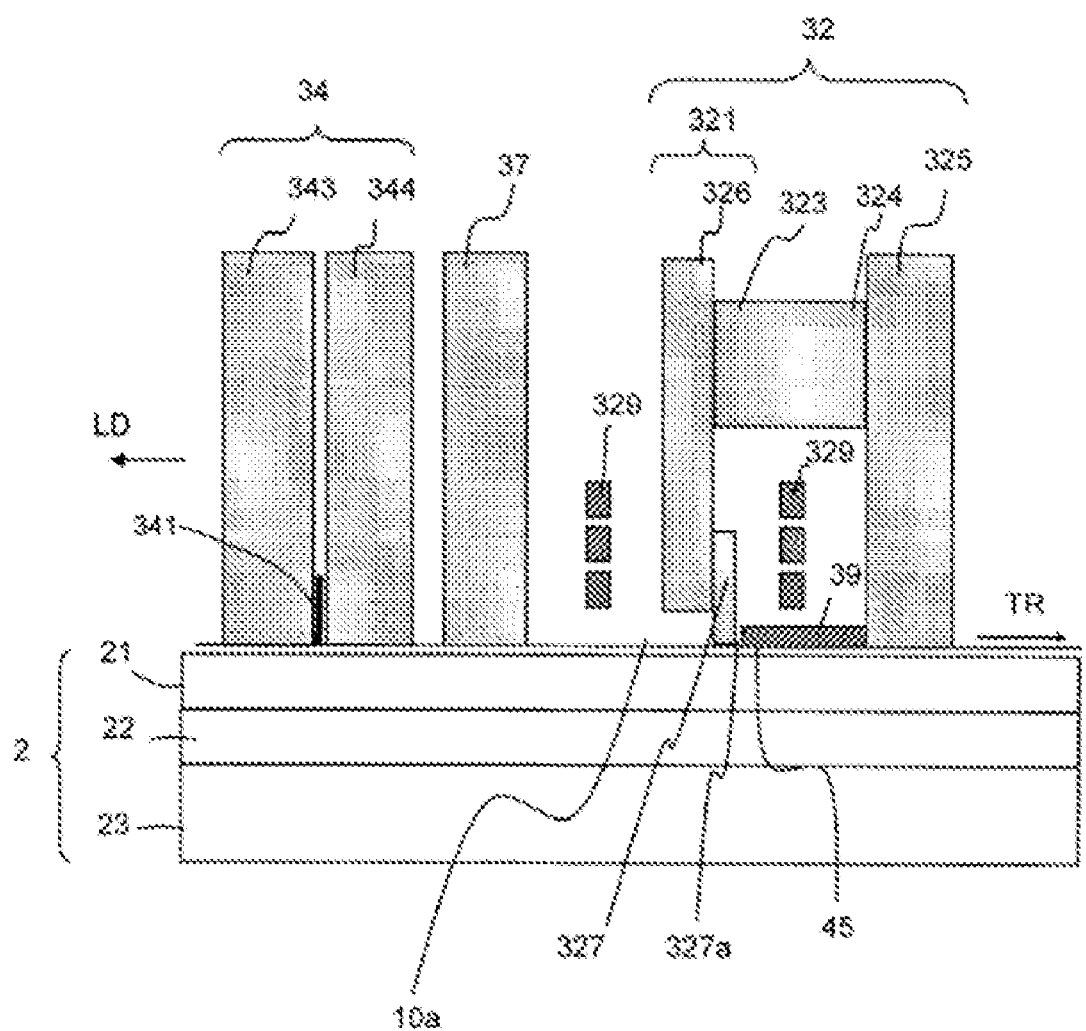
(Figure 4)

(Figure 5)
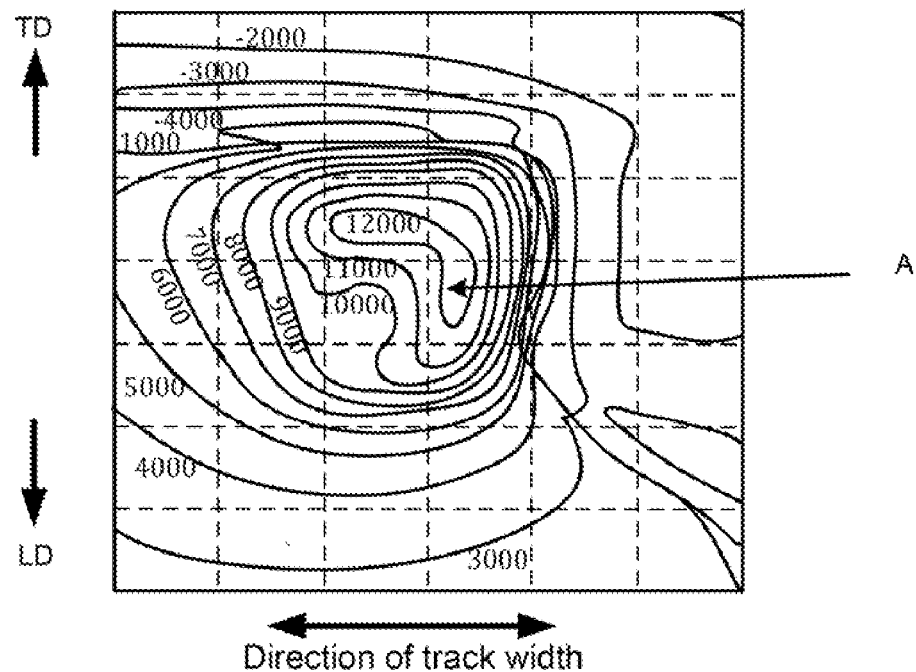
(Figure 6)
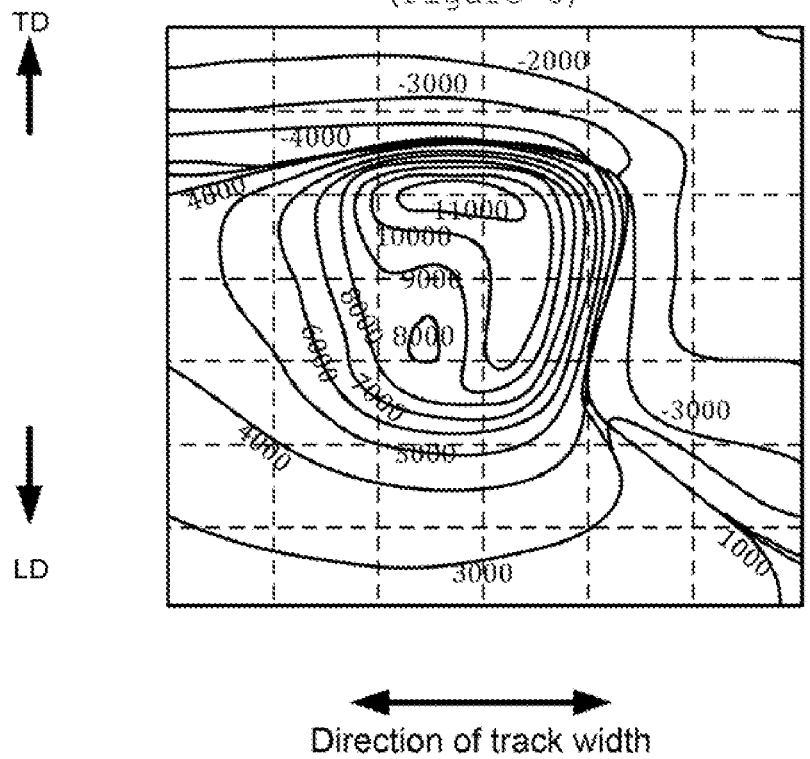

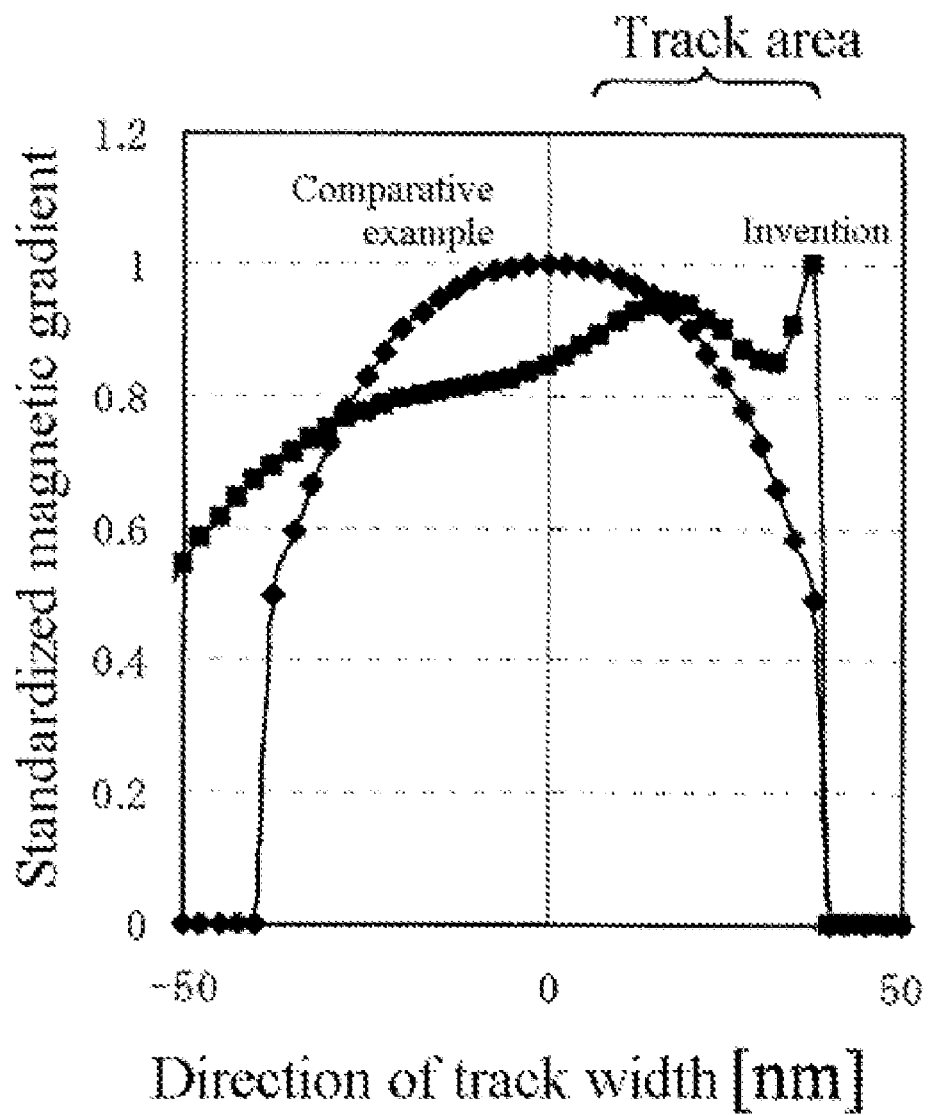
(Figure 7)

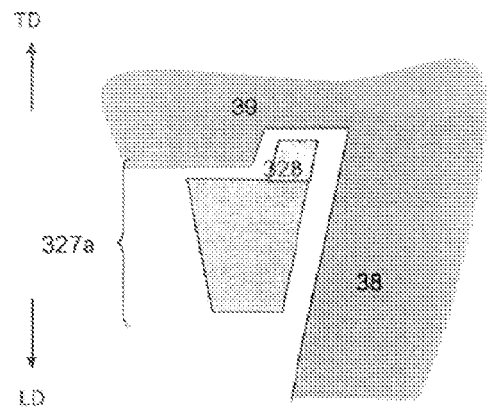
(Figure 8)
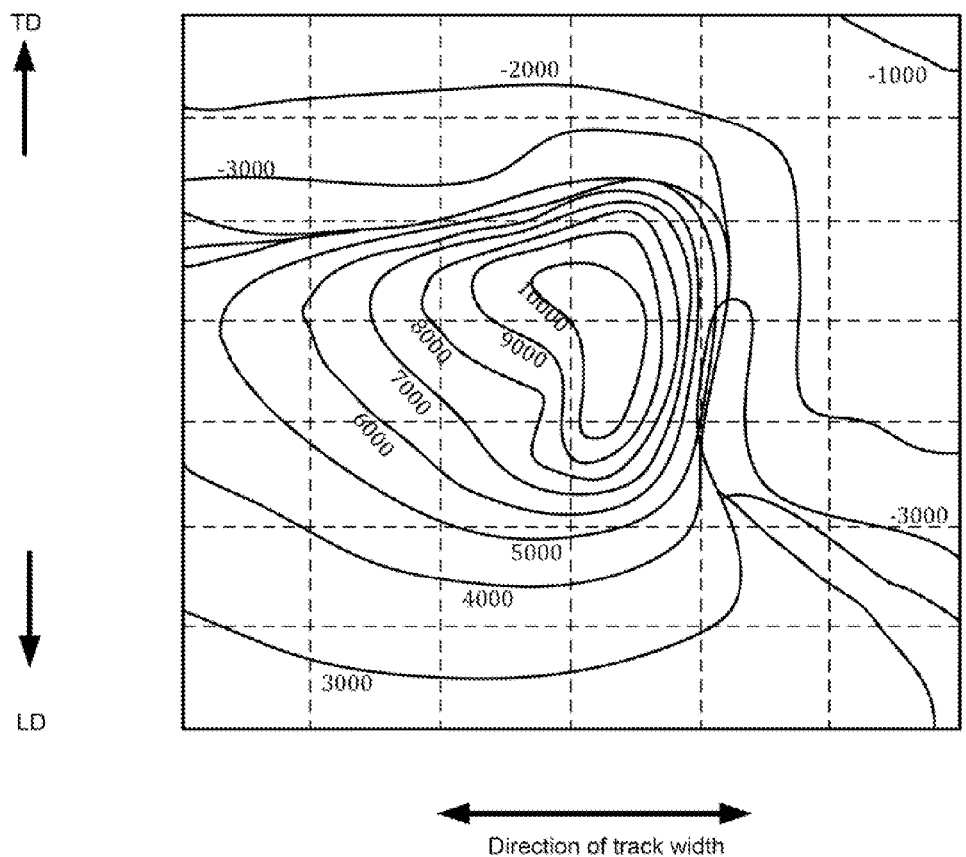
(Figure 9)

(Figure 10)
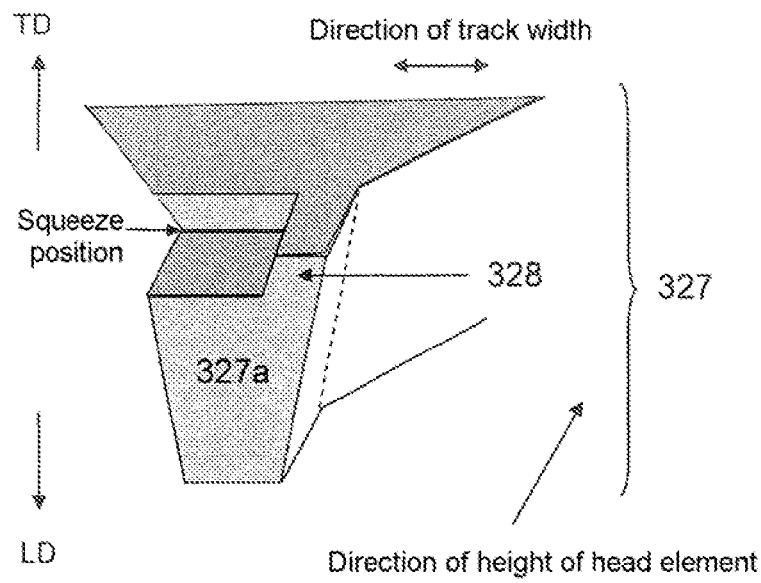
(Figure 11)
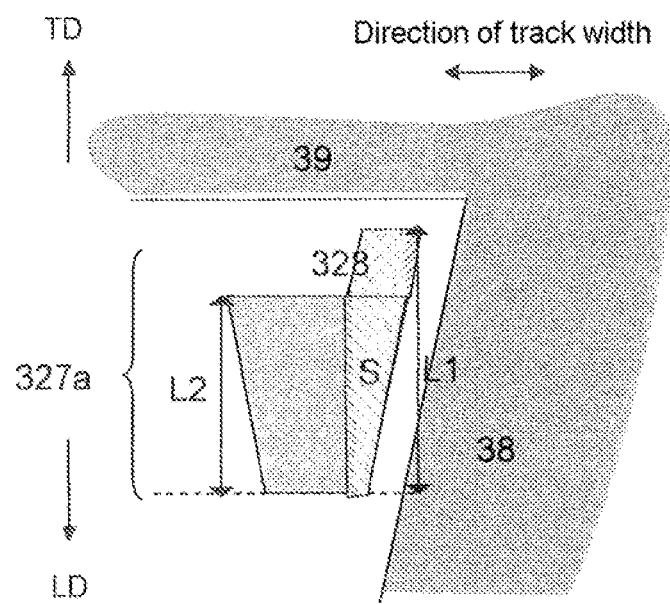

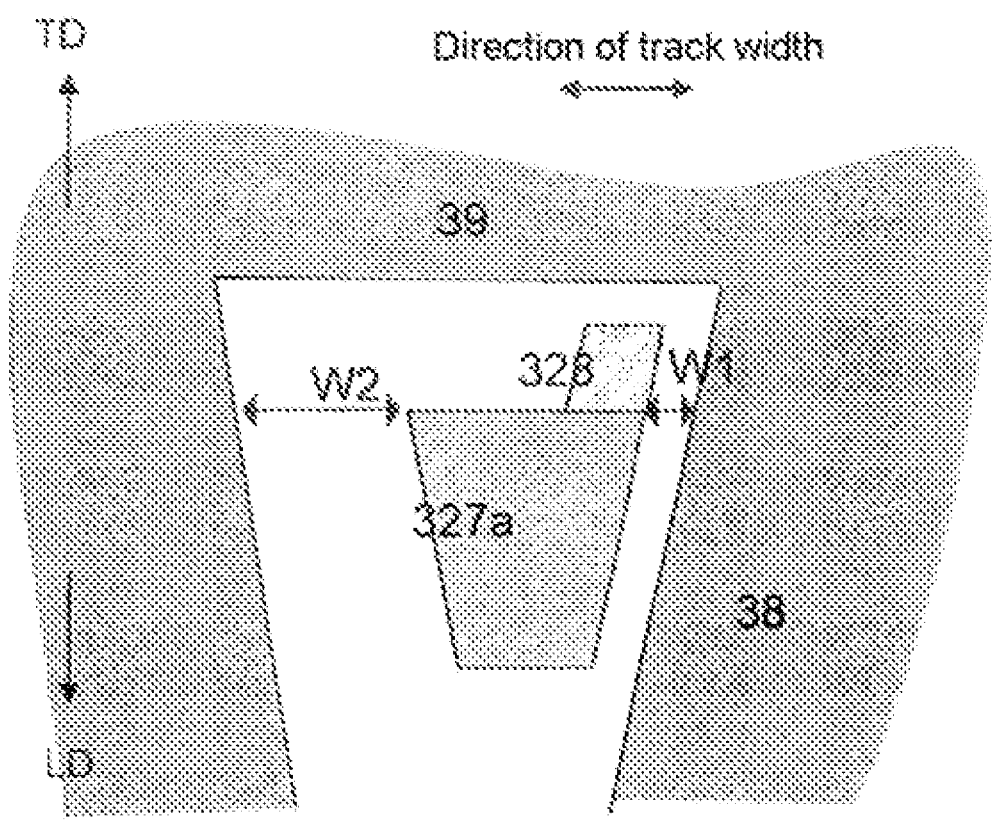
(Figure 12)

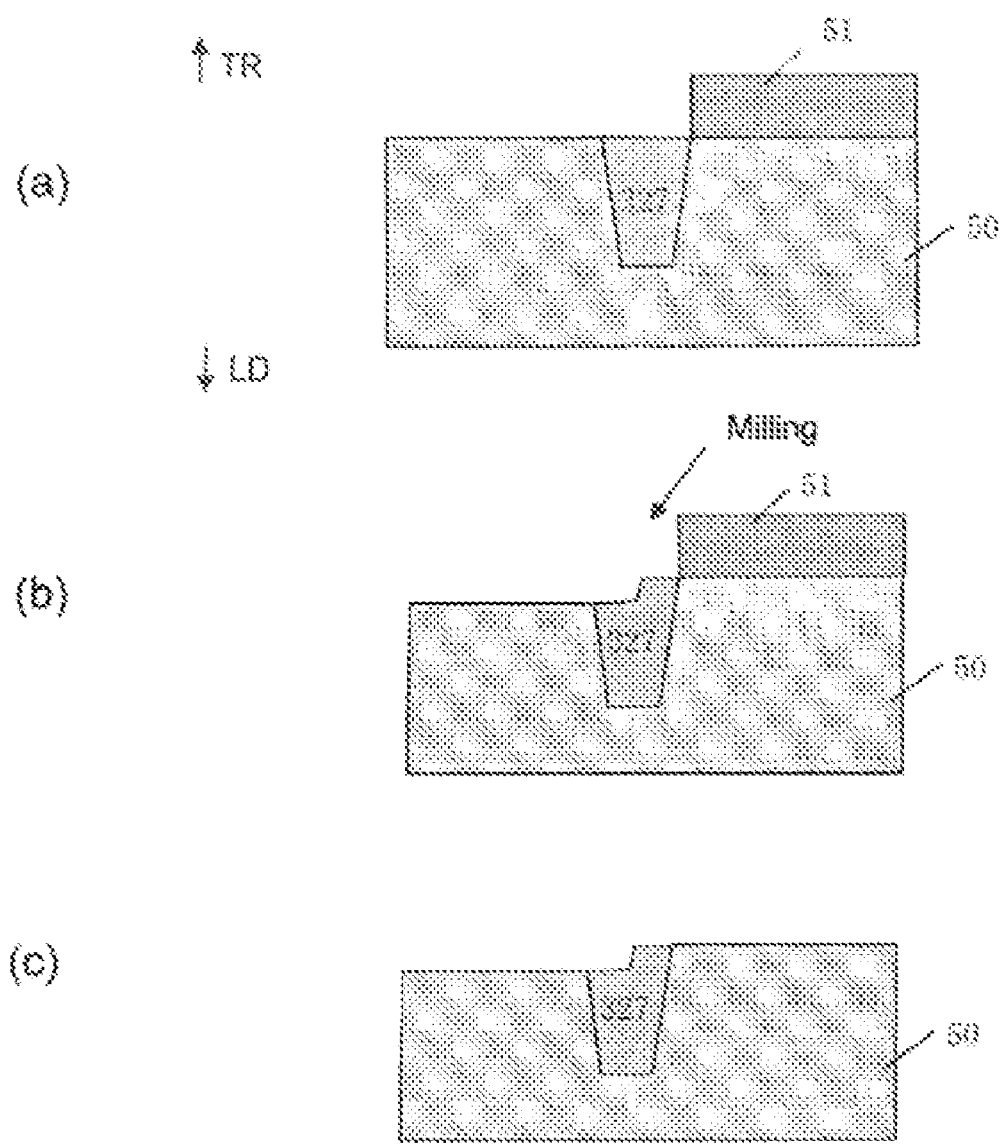
(Figure 13)

(Figure 14)
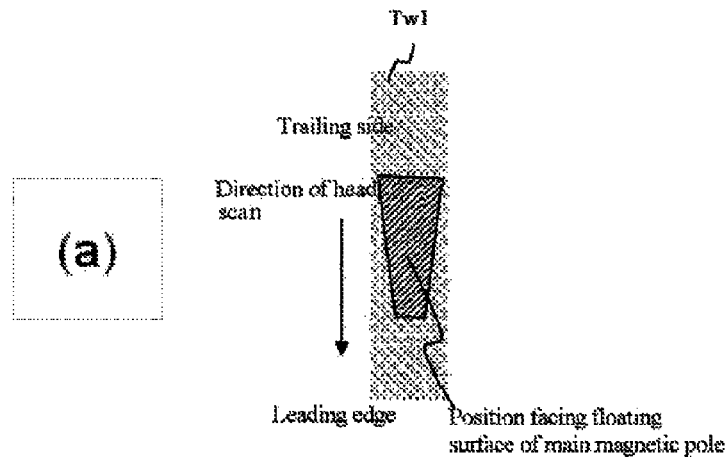
(a)
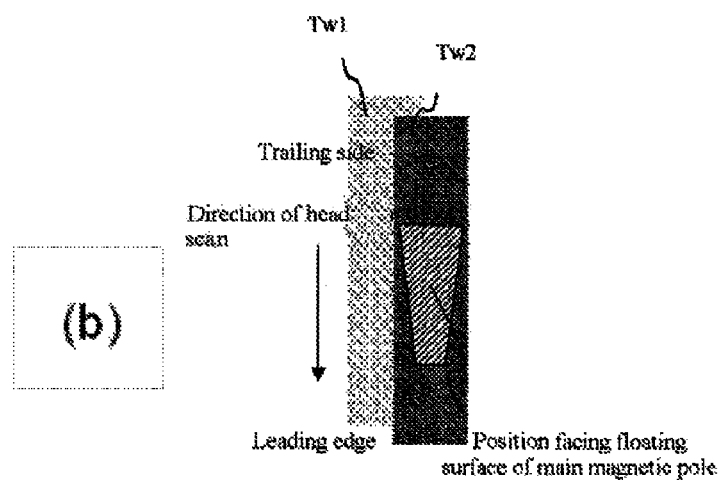
(b)
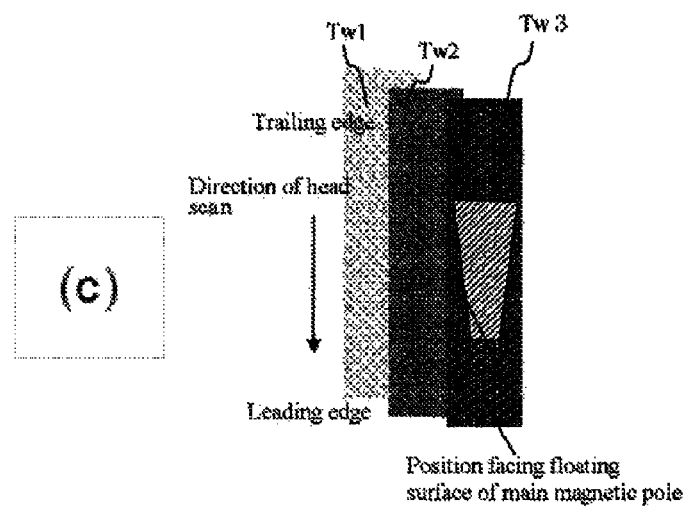
(c)

MAGNETIC HEAD HAVING AN ASYMMETRICAL SHAPE AND SYSTEMS THEREOF

FIELD OF THE INVENTION

The present invention relates to magnetic recording, and more particularly, to a magnetic head having an asymmetrical shape used in perpendicular shingled recording.

BACKGROUND OF THE INVENTION

High-density recording technology for magnetic disk devices has made significant progress in recent years, including remarkable advances in the miniaturization of the magnetic poles included with the magnetic recording heads. However, since a correlation between the strength of the recording magnetic field generated by the magnetic recording head and the volume of the magnetic pole exists, a problem arises in that increased miniaturization of the magnetic pole makes it more difficult to maintain the strength of the recording magnetic field.

Thermally-assisted recording has been developed as one way of dealing with this problem. Thermally-assisted recording works by heating the magnetic recording medium as recording takes place to reduce the coercive field strength, and is a method of recording which reduces the magnetic field strength required for writing. Moreover, more recently a microwave-assisted recording system has been proposed as another form of assisted recording which uses spin torque to enable recording densities greater than 1 Tb/in$^2$. With this system, a high-speed magnetized rotor which rotates at high speed is positioned adjacent to the main magnetic pole of a perpendicular magnetic recording head, with microwaves being radiated onto the magnetic recording medium, recording data on a magnetic recording medium, which has large magnetic anisotropy. Application to the medium of microwaves generated by an oscillator means that the magnetic field required for magnetic reversal in the medium is reduced. This indicates that the strength of the recording magnetic field generated by the main magnetic pole of the magnetic recording head can be less than that required in other conventional devices not using microwaves.

Moreover, as cited both in U.S. Pat. No. 7,443,625 and Tagawa Kanai et al., *SRC 27$^{th}$ Technical Report Materials*, May 2009, the shingled recording system has been proposed as another high-density recording system. With the shingled system, the tracks recorded in the magnetic recording medium by the magnetic head are partially overlapped. This enables a magnetic recording device to have a track pitch smaller than the tracks recorded. It is also considered possible to use a perpendicular magnetic recording device in which the width of the magnetic pole of the recording head is wider than in conventional devices.

In light of the above situation, it would be beneficial to have a magnetic head that can produce a sufficient recording magnetic field strength while being operated in recently developed systems, such as microwave-assisted recording systems and shingled recording systems.

SUMMARY OF THE INVENTION

In one embodiment, a magnetic head includes a main magnetic pole having a protruding portion such that a distance from a first side of a trailing edge of the main magnetic pole to a leading edge of the main magnetic pole is different from a distance from a second side of the trailing edge of the main magnetic pole to the leading edge of the main magnetic pole, an auxiliary magnetic pole, and a coil wound around a magnetic circuit, the magnetic circuit including the main magnetic pole and the auxiliary magnetic pole.

In another embodiment, a magnetic head includes a main magnetic pole having a protruding portion such that a distance from a first side of a trailing edge of the main magnetic pole to a leading edge of the main magnetic pole is different from a distance from a second side of the trailing edge of the main magnetic pole to the leading edge of the main magnetic pole, an auxiliary magnetic pole, and a coil wound around a magnetic circuit, the magnetic circuit including the main magnetic pole and the auxiliary magnetic pole. The protruding portion of the main magnetic pole is comprised of a magnetic material having a higher degree of saturated flux density than the remainder of the main magnetic pole. Also, the protruding portion of the main magnetic pole is comprised of a magnetic material having a higher iso-magnetic permeability than the remainder of the main magnetic pole, and a magnetic body is positioned towards the trailing side of the main magnetic pole and towards a track width side of the main magnetic pole.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 1 is an oblique view of a magnetic disk device, according to one embodiment.

FIG. 2 is a diagram showing the front end of a head assembly, according to one embodiment.

FIGS. 3(a)-(b) show several views of a portion of a magnetic head, according to one embodiment.

FIG. 4 is a cross-sectional view of a magnetic head at the track center, according to one embodiment.

FIG. 5 shows iso-magnetic field curves illustrating an effect of using the magnetic head, according to one embodiment.

FIG. 6 shows iso-magnetic field curves illustrating an effect of using a magnetic head, according to a comparative example.

FIG. 7 shows magnetic gradients illustrating an effect of using the magnetic head, according to one embodiment.

FIG. 8 is a plan view of the magnetic head seen from the floating surface, according to one embodiment.

FIG. 9 shows iso-magnetic field curves illustrating an effect of using the magnetic head, according to one embodiment.

FIG. 10 is an oblique view of the tip of a main magnetic pole in a magnetic head, according to one embodiment.

FIG. 11 is a plan view of a magnetic head seen from the floating surface, according to one embodiment.

FIG. 12 is a plan view of the magnetic head seen from the floating surface, according to one embodiment.

FIGS. 13(a)-(c) show a diagram of a construction process of a magnetic head, according to one embodiment.

FIGS. 14(a)-(c) show a schematic diagram illustrating the overlapping of tracks in a shingled magnetic recording system.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic head includes a main magnetic pole having a protruding portion such that a distance from a first side of a trailing edge of the main magnetic pole to a leading edge of the main magnetic pole is different from a distance from a second side of the trailing edge of the main magnetic pole to the leading edge of the main magnetic pole, an auxiliary magnetic pole, and a coil wound around a magnetic circuit, the magnetic circuit including the main magnetic pole and the auxiliary magnetic pole.

In another general embodiment, a magnetic head includes a main magnetic pole having a protruding portion such that a distance from a first side of a trailing edge of the main magnetic pole to a leading edge of the main magnetic pole is different from a distance from a second side of the trailing edge of the main magnetic pole to the leading edge of the main magnetic pole, an auxiliary magnetic pole, and a coil wound around a magnetic circuit, the magnetic circuit including the main magnetic pole and the auxiliary magnetic pole. The protruding portion of the main magnetic pole is comprised of a magnetic material having a higher degree of saturated flux density than the remainder of the main magnetic pole. Also, the protruding portion of the main magnetic pole is comprised of a magnetic material having a higher isomagnetic permeability than the remainder of the main magnetic pole, and a magnetic body is positioned towards the trailing side of the main magnetic pole and towards a track width side of the main magnetic pole.

A shingled recording system, according to one embodiment, is a device in which tracks are recorded onto a magnetic recording medium by a magnetic head with the tracks partially overlapping. A magnetic recording device can be created which has a track pitch smaller than the tracks being recorded. It is also possible to have a magnetic head with a magnetic pole wider than those used in conventional magnetic recording devices by designing the magnetic pole differently. However, as the tracks are recorded in an overlapped fashion, the quality of the recording magnetic field is more important at the edges of the tracks than in the middle.

With conventional perpendicular recording heads, the strength and gradient of the magnetic field is large at the center of the track. For this reason, if a perpendicular magnetic recording head having a conventional structure is used as a shingled recording head, a difficulty arises where the good characteristics of the recording head will not be utilized. To improve recording performance, it is desirable to concentrate the distribution of the magnetic field more to the edge portions of the main magnetic pole of the recording head. Japanese Patent Office Pub. No. 2006-323899 and Tagawa Kanai et al.; SRC 27th Technical Report Materials, May 2009, cite devices where a side shield is fitted to one side only, but further improvements to the head are desirable.

Taking note of the above situation, it is desirable to have a magnetic pole design for a magnetic recording head suitable for a shingled magnetic recording system in which the quality of the magnetic field in the vicinity of the track edges is improved. A magnetic head, according to one embodiment, has a structure whereby the distances from the leading edge to the left and right ends of the trailing side of the main magnetic pole are different.

In another embodiment, the trailing side of the main magnetic pole is provided with a protrusion or a step on one side only. Furthermore, the saturated magnetic flux density of the protruding portion of the main magnetic pole is large. In another embodiment, the magnetic permeability of the protruding portion of the main magnetic pole is high.

According to one embodiment, it is possible to provide a magnetic recording head suitable for a shingled magnetic recording system in which the magnetic gradient in the vicinity of the track edges is improved.

An embodiment of the magnetic disk device, head assembly, and head slider on which the magnetic recording head is mounted is described with reference to the drawings.

FIG. 1 shows an oblique view of a magnetic disk device 1. In FIG. 1, the top cover is not shown. Magnetic recording medium 2 and head assembly 4 are accommodated within the chassis of the magnetic disk device 1. Magnetic recording medium 2 is attached to a spindle motor 3 which is provided on the bottom of the chassis. Head assembly 4 is supported on bearings so as to be rotatable adjacent to the magnetic recording head 2. The front end of this head assembly 4 is provided with a suspension arm 5, the tip of which supports a head slider 10. At the same time, a coil motor 7 is provided at the rear end of head assembly 4, such as a voice coil motor. The coil motor 7 is the drive source which rotates the head assembly 4, and moves the head slider 10 across the magnetic recording medium 2 in an approximately radial direction.

FIG. 2 is a schematic diagram illustrating the front end of a head assembly 4. In the diagram, directions X, Y, and Z, respectively, show the longitudinal, lateral, and depth directions for the head slider 10. Of these, direction Z corresponds to the direction of float for the head slider 10. Moreover, directions X and Y essentially correspond, respectively, to the rotational and diametric directions (in other words, the longitudinal and lateral directions of the track) of the magnetic recording head 2. Furthermore, arrow DR shows the direction of rotation of the magnetic recording medium 2, arrow LD shows the leading direction of the head slider 10, and arrow TR shows the trailing direction of the head slider 10.

Head slider 10 is supported at the tip of the suspension arm 5. With this head slider 10, surface 10a, which faces disk-shaped medium 2, is known as an Air Bearing Surface (ABS) and floats above the rotating disk-shaped medium 2 due to the wedge effect of a gas, such as air. This head slider 10 is provided with a slide base 12 of a flattened orthogonal shape comprised of sintered aluminum, titanium carbide, etc., and thin film section 14 is formed using a thin-film forming method on the end surface of the trailing side of the slide base 12.

FIG. 4 is a schematic cross-sectional view showing the main parts of the thin film (14, FIG. 2) provided on the trailing section of the head slider 10. A recording head (32, FIG. 4) is provided with a pillar 323 comprising a magnetic body between a main magnetic pole 321 and an auxiliary magnetic pole 325. The main magnetic pole 321, auxiliary magnetic pole 325 and pillar 323 are comprised of a soft magnetic material, such as permalloy, CoFe alloy, etc. The main magnetic pole 321 is attached to a tip section 327 via a yoke 326. Tip section 327 extends as far as the medium-facing surface 10a of the head, its tip surface 327a appearing on the medium-facing surface 10a. The trailing side and side edge of the tip section 327 are provided with a side shield 38 and a trailing shield 39 to enhance the magnetic gradient. Playback head 34 contains a playback element 341 comprising a magnetic resistance effect element and a pair of magnetic shields 343, 344 which surround the magnetic resistance effect element. Furthermore, shield 37 comprising a magnetic body is provided with the purpose of reducing influx of the recording magnetic field into the magnetic shield 344.

The main magnetic pole 321 is magnetized by a coil 329 wound around the yoke 326, with the recording magnetic field being generated from the tip surface 327a of the tip section 327. The recording magnetic field generated from the tip section 327 penetrates magnetic recording layer 21 and intermediate layer 22 of the magnetic disk 2 perpendicularly, and is returned at the soft magnetic reversing layer 23, being absorbed by the auxiliary magnetic pole 325. The recording is magnetized and written into magnetic recording layer 21 by the recording magnetic field generated from the tip section 327.

FIGS. 3(a)-(b) show several views of the magnetic recording head, in some embodiments. FIG. 3(a) is an overall plan view of the main parts of the thin film 14 seen from the floating surface, and FIG. 3(b) is an enlarged view showing the vicinity of the end section of the main magnetic pole. The end section of the main magnetic pole, according to one embodiment, has a structure whereby the distances from the leading edge to a first and second end of the trailing side of the main magnetic pole are different. In other words, the main magnetic pole has a structure such that L1 shown in FIG. 3(b) is larger than L2. For purposes of explanation, and not limiting in any way, the first and second ends will be described as the left and right ends of the trailing side of the main magnetic pole, as depicted in FIG. 3(b), for use in shingled recording systems where the tracks are written from the right to left. However, the protruding portion of the main magnetic pole may be on either side of the main magnetic pole, and is not limited to a left or right side as described herein. Thus, if the tracks are written from the left to the right, the protruding portion 328 may be positioned on the left side of the main magnetic pole.

With continued reference to FIG. 3(b), this type of structure is possible due to the projecting portion 328. Moreover, the structure of the side shield is such that it is only provided on the L1 side, according to one approach. Of course, a shield may be provided on other sides of the main magnetic pole as well. By arranging the magnetic head in this way, it is possible to provide a magnetic recording head suitable for shingled magnetic recording in which the magnetic field gradient is improved in the vicinity of the track edges.

FIG. 5 is a diagram showing results of three-dimensional magnetic field calculation of magnetic field strength applied to the magnetic recording medium device of the magnetic head, according to one embodiment.

The calculation is performed as follows, with reference to FIG. 4. The magnetic field generated from the main magnetic pole 321 including the tip section 327 is calculated in a three-dimensional magnetic field calculation which uses the limited element method. The gap between the tip section 327 of main magnetic pole 321 and the trailing shield 39 is about 25 nm. The gap between the tip section 327 of the main magnetic field 321 and the side shield 38 is about 40 nm. The width of the end section of the trailing side of the end surface 327a of the main magnetic pole 321 is about 80 nm. End surface 327a of the main magnetic pole 321 is bevelled to an angle α of about 9°, giving it a reverse trapezoidal shape in which the width of the leading edge end is narrower than the width of the trailing side end. The material of tip section 327 of the main magnetic pole 321 is assumed to be CoNiFe (but is not so limited), with a saturated magnetic flux density of 2.4 T, and relative magnetic permeability of 100. Yoke section 326 of the main magnetic pole 321 is assumed to be 80 at % Ni-20 at % Fe (but not so limited) with a saturated magnetic flux density of 1.0 T. For the auxiliary magnetic pole 325, the saturated magnetic flux density of the material is assumed to be 1.0 T, with the width in the Y direction being about 30 μm, the length in the Z direction about 16 μm, and the length in the X direction about 2 μm.

Moreover, magnetic shields 343, 344 of the playback head, and shield 37 are assumed to be 80 at % Ni-20 at % Fe (but not so limited) with a saturated flux density of 1.0 T, the width in the Y direction being about 32 μm, the length in the Z direction about 16 μm, and the length in the X direction about 1.5 μm. The magnetic material for the magnetic body 38 is assumed to be 45 at % Ni-55 at % Fe (but not so limited), with a saturated flux density of 1.7 T and relative magnetic permeability of 1000. The thickness of the trailing shield 39 and the side shield 38 is about 200 nm. The number of windings on coil 329 is assumed to be 4 turns, with the recording current being about 35 mA. The soft magnetic under layer 23 of the magnetic disk 2 is made of a material with a saturated flux density of 1.1 T, and a thickness of about 40 nm is assumed. The thickness of the magnetic recording layer 21 is about 19 nm. The thickness of the intermediate layer 22 is about 22 nm. It is presumed that the head slider 10 will float by about 9 nm. Thus the distance between the surface of the under layer 23 and the slider 10 is about 50 nm. The recording magnetic field is calculated as the value at the position of the magnetic recording layer 21 at a depth of about 18.5 nm from the medium-facing surface 10a.

The X-axis in FIG. 5 shows the width direction and the Y-axis in the scanning direction. The interval between iso-magnetic curves is 1000 (×1000/4π[A/M]). It is clear that the magnetic field distribution is concentrated on the right side of the diagram. It will be seen that the magnetic field is greatest in the vicinity shown by the letter A in the diagram.

FIG. 6 shows iso-magnetic curves for a structure without a protruding portion 328. The magnetic field has not increased in the position corresponding to letter A in FIG. 5.

FIG. 7 shows the profile for the magnetic gradient at the magnetic field position of $8\times10^3$ (×1000/4π[A/M]). The X-axis shows the position in the track width direction, the Y-axis the magnetic gradient standardized for the respective maximum magnetic gradients. Compared to the conventional structure without a projecting portion (328, FIG. 4), it is clear that with the structure disclosed herein, the magnetic gradient is largest at the center on the right side of the graph, referring to FIG. 7. In the case of shingled recording, the edge of one side of the magnetic distribution is used to record the track. For this reason, the structure with a large magnetic gradient on one side is suitable for shingled magnetic recording.

To have a large variation in the magnetic distribution, it is desirable that the width in the track width direction of the protruding portion (328, FIG. 4) be smaller than other track width directions for protruding portion 328. Moreover, if the length of protruding portion 328 in the scan direction is greater than the width in the track width direction, it is possible to vary the magnetic distribution more.

FIG. 8 is a diagram showing the structure of another embodiment. It has a structure such that the trailing shield has a shape which follows the main magnetic pole. FIG. 9 shows iso-magnetic curves for which the magnetic distribution was calculated with the three-dimensional magnetic method used for the structure in FIG. 8. The portions with a higher magnetic field density in the diagram have shifted to the right, meaning that the device is suitable for shingled magnetic recording.

FIG. 10 shows an oblique view of an example of the tip of the main magnetic pole, according to one embodiment. To vary the magnetic distribution so that it is suitable for shingled magnetic recording, it is desirable that protruding portion 328 be provided in the direction of height of the head element toward the first position (squeeze position) from the floating surface in which the width in the track width direction varies greatly.

Moreover, as shown in FIG. 11, the saturated magnetic flux density of the magnetic body used across the range of protruding portion 328 may be larger than the tip section 327 of the main magnetic pole. In this way, it is possible to concentrate the flux to make it suitable for shingled magnetic recording. Moreover, the saturated magnetic flux density of the magnetic body on one side of the leading edge of protruding portion 328 may be made greater than tip section 327 of the other main magnetic pole. In addition to the saturated magnetic flux density, the relative magnetic permeability may also be larger.

In the case where side shields are provided on both sides as shown in FIG. 12, it is desirable that gap W1 between the main magnetic pole on the side of protruding portion 328 and the side shield be less than W2. In this way, it is possible to concentrate the magnetic distribution on one side of the track so that it is suitable for shingled magnetic recording.

The manufacture of the main magnetic pole, according to one embodiment, involves the formation of a non-magnetic layer after a magnetic film has been formed on the main magnetic pole, with a subsequent process in which the magnetic film of the main magnetic pole is cut away using this non-magnetic layer as a mask.

FIGS. 13(a)-(c) show an example of this portion of a manufacturing process for the main magnetic pole, according to one embodiment. The diagram shows the shape seen from the floating surface, with the trailing and leading directions shown at the top and bottom of the diagram, the track width being shown to left and right.

In FIG. 13(a) a situation where an inorganic insulating layer 50 has been formed is shown, and after the formation of the tip section 327, resist pattern 51 is formed above it. Methods of forming tip section 327 include a process which uses a magnetron sputter method using photo resist as a mask, and a process which employs plating using the resist pattern used to form the main magnetic pole. Resist pattern 51 is characterized in being formed asymmetrically. Next, as shown in FIG. 13(b), this resist pattern 50 is used as a mask, and a tip section 327 and inorganic insulation film 50 are cut away using ion milling. Materials suitable for inorganic insulation film 50 include, but are not limited to, $Al_2O_3$, AlN, $Ta_2O_5$, TiC, $TiC_2$, $SiO_2$, SiO, etc. In FIG. 13(c) the resist pattern 51 is shown removed after ion milling. The side shield and trailing shields are then formed. The side shield may be formed in advance of the process shown in FIGS. 13(a)-(c). Moreover, after the process in FIG. 13 and after forming the non-magnetic film for the trailing gap, a process may be carried out including chemical polishing, mechanical polishing, etc., to flatten the surface. Using this method, it is possible to manufacture the magnetic head described herein according to several embodiments.

In FIGS. 14(a)-(c), an illustrative shingled recording system is shown. In FIG. 14(a), a first track having a track width Tw1 is recorded. The relative movement between the disc and the trapezoidal shaped head is such that the head scan moves in a direction pointing down. In FIG. 14(b), a second track having a track width Tw2 is recorded adjacent to the first track. As can be seen, the first and second track overlap slightly. In FIG. 14(c), a third track having a track width Tw3 is recorded adjacent to the second track. Once again, the third track overlaps slightly with the second track. Therefore, as previously described, the magnetic flux properties of the head at the track width edges is important in shingled recording systems. As shown here, tracks are written left to right, but may be written right to left.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a main magnetic pole having a protruding portion extending from a trailing end thereof, a trailing edge, a leading edge, and side edges extending between the trailing and leading edges along opposite sides of the main magnetic pole, wherein a length of the side edge extending between the trailing edge of the protruding portion of the main magnetic pole and the leading edge of the main magnetic pole is different than a length of the other side edge of the main magnetic pole;
an auxiliary magnetic pole; and
a coil wound around a magnetic circuit, the magnetic circuit including the main magnetic pole and the auxiliary magnetic pole.

2. A disk drive system, comprising:
a magnetic storage medium;
at least one magnetic head as recited in claim 1 for writing to the magnetic medium;
a slider for supporting the magnetic head; and
a control unit coupled to the magnetic head for controlling operation of the magnetic head.

3. A magnetic head, comprising:
a main magnetic pole having a protruding portion such that a distance from a first side of a trailing edge of the main magnetic pole to a leading edge of the main magnetic pole is different from a distance from a second side of the trailing edge of the main magnetic pole to the leading edge of the main magnetic pole;
an auxiliary magnetic pole; and
a coil wound around a magnetic circuit the magnetic circuit including the main magnetic pole and the auxiliary magnetic pole,
wherein the protruding portion of the main magnetic pole is comprised of a magnetic material having at least one of; a higher degree of saturated flux density and a higher iso-magnetic permeability than a remainder of the main magnetic pole.

4. A disk drive system, comprising:
a magnetic storage medium;
at least one magnetic head as recited in claim 3 for writing to the magnetic medium;
a slider for supporting the magnetic head; and
a control unit coupled to the magnetic head for controlling operation of the magnetic head.

5. A magnetic head, comprising:
a main magnetic pole having a protruding portion such that a distance from a first side of a trailing edge of the main magnetic pole to a leading edge of the main magnetic pole is different from a distance from a second side of the trailing edge of the main magnetic pole to the leading edge of the main magnetic pole;
an auxiliary magnetic pole; and
a coil wound around a magnetic circuit, the magnetic circuit including the main magnetic pole and the auxiliary magnetic pole,
wherein a magnetic body is positioned towards the trailing side of the main magnetic pole and towards a track width side of the main magnetic pole.

6. The magnetic head according to claim 5, wherein a first distance between a first track width side of the main magnetic pole and the magnetic body positioned towards the first track width side of the main magnetic pole is different from a second distance between a second track width side of the main magnetic pole and the magnetic body positioned towards the second track width side of the main magnetic pole, wherein the protruding portion of the main magnetic pole is positioned on a track width side having a smaller distance.

7. The magnetic head according to claim 5, wherein the magnetic body positioned on the track width side is only positioned on the track width side of the main magnetic pole having the protruding portion.

8. The magnetic head according to claim 5, wherein a portion of the magnetic body which faces the trailing side of the main magnetic pole is straight.

9. The magnetic head according to claim 5, wherein the protruding portion of the main magnetic pole is comprised of a magnetic material having a higher degree of saturated flux density than the remainder of the main magnetic pole.

10. The magnetic head according to claim 5, wherein the protruding portion of the main magnetic pole is comprised of a magnetic material having a higher iso-magnetic permeability than the remainder of the main magnetic pole.

11. A disk drive system, comprising:
a magnetic storage medium;
at least one magnetic head as recited in claim 5 for writing to the magnetic medium;
a slider for supporting the magnetic head; and
a control unit coupled to the magnetic head for controlling operation of the magnetic head.

12. A magnetic head, comprising:
a main magnetic pole having a protruding portion such that a distance from a first side of a trailing edge of the main magnetic pole to a leading edge of the main magnetic pole is different from a distance from a second side of the trailing edge of the main magnetic pole to the leading edge of the main magnetic pole;
an auxiliary magnetic pole; and
a coil wound around a magnetic circuit, the magnetic circuit including the main magnetic pole and the auxiliary magnetic pole,
wherein the protruding portion of the main magnetic pole is comprised of a magnetic material having a higher degree of saturated flux density than the remainder of the main magnetic pole,
wherein the protruding portion of the main magnetic pole is comprised of a magnetic material having a higher iso-magnetic permeability than the remainder of the main magnetic pole, and
wherein a magnetic body is positioned towards the trailing side of the main magnetic pole and towards a track width side of the main magnetic pole.

13. The magnetic head according to claim 12, wherein a portion of the magnetic body which faces the trailing side of the main magnetic pole is straight.

14. The magnetic head according to claim 12, wherein the magnetic body positioned towards the track width side is only positioned towards the track width side of the main magnetic pole having the protruding portion.

15. The magnetic head according to claim 12, wherein a first distance between a first track width side of the main magnetic pole and the magnetic body positioned towards the first track width side of the main magnetic pole is different from a second distance between a second track width side of the main magnetic pole and the magnetic body positioned towards the second track width side of the main magnetic pole, wherein the protruding portion of the main magnetic pole is positioned on a track width side having a smaller distance.

16. A disk drive system, comprising:
a magnetic storage medium;
at least one magnetic head as recited in claim 12 for writing to the magnetic medium;
a slider for supporting the magnetic head; and
a control unit coupled to the magnetic head for controlling operation of the magnetic head.

* * * * *